(12) United States Patent
Silverio et al.

(10) Patent No.: US 9,046,128 B2
(45) Date of Patent: Jun. 2, 2015

(54) ROLLER BEARING FOR WIND TURBINES

(71) Applicant: SCHAEFFLER TECHNOLOGIES AG & CO. KG, Herzogenaurach (DE)

(72) Inventors: Antonio Silverio, Danbury, CT (US); Ryan Greenfield, Vernon Hills, IL (US)

(73) Assignee: Schaeffler Technologies AG & Co. KG, Herzogenaurch (DE)

( * ) Notice: Subject to any disclaimer, the term of this patent is extended or adjusted under 35 U.S.C. 154(b) by 0 days.

(21) Appl. No.: 14/056,437

(22) Filed: Oct. 17, 2013

(65) Prior Publication Data

US 2014/0112607 A1    Apr. 24, 2014

Related U.S. Application Data

(60) Provisional application No. 61/715,701, filed on Oct. 18, 2012, provisional application No. 61/820,079, filed on May 6, 2013.

(51) Int. Cl.
| | |
|---|---|
| *F16C 23/08* | (2006.01) |
| *F16C 19/38* | (2006.01) |
| *F16C 33/36* | (2006.01) |
| *F16C 33/48* | (2006.01) |
| *F16C 33/60* | (2006.01) |
| *F16C 33/64* | (2006.01) |

(52) U.S. Cl.
CPC .............. *F16C 19/38* (2013.01); *F16C 33/485* (2013.01); *F16C 23/086* (2013.01); *F16C 33/60* (2013.01); *F16C 33/64* (2013.01); *F16C 2300/14* (2013.01); *F16C 2360/31* (2013.01); *F16C 2240/34* (2013.01)

(58) Field of Classification Search
CPC .... F16C 19/381; F16C 19/505; F16C 23/086; F16C 33/4682; F16C 33/641; F16C 2240/34; F16C 33/485; Y02E 10/721; Y02E 10/722; H02K 7/183
USPC ......... 384/450, 495, 548, 558, 564–565, 568, 384/572, 618, 623, 619, 621
See application file for complete search history.

(56) References Cited

U.S. PATENT DOCUMENTS

| | | | | |
|---|---|---|---|---|
| 2,089,048 | A * | 8/1937 | Bachman | 384/571 |
| 2,418,322 | A * | 4/1947 | Spicacci | 384/571 |
| 2,577,589 | A * | 12/1951 | Palmgren | 384/564 |
| 2,740,675 | A * | 4/1956 | Palmgren | 384/564 |
| 3,166,363 | A | 1/1965 | Kay | |
| 4,475,777 | A | 10/1984 | Hofmann et al. | |
| 5,586,826 | A * | 12/1996 | Kellstrom et al. | 384/450 |
| 5,975,762 | A * | 11/1999 | Ai | 384/450 |

(Continued)

FOREIGN PATENT DOCUMENTS

| | | | | |
|---|---|---|---|---|
| EP | 1705392 | A1 * | 9/2006 | F03D 11/00 |
| GB | 139512 | A | 7/1920 | |

(Continued)

OTHER PUBLICATIONS

International Search Report for PCT/US2013/065441, mailed Jan. 17, 2014 by Koren Intellectual Property Office.

*Primary Examiner* — Marcus Charles
(74) *Attorney, Agent, or Firm* — Antun M. Peakovic

(57) ABSTRACT

A self aligning bearing assembly comprising an inner ring and an outer ring, and two rows of rolling elements of equal length arranged at different contact angles, for supporting a main shaft of a wind turbine.

2 Claims, 1 Drawing Sheet

(56) References Cited

U.S. PATENT DOCUMENTS

| | | | |
|---|---|---|---|
| 6,116,785 A * | 9/2000 | Kondo et al. | 384/572 |
| 7,918,649 B2 | 4/2011 | Nakagawa et al. | |
| 2007/0127858 A1* | 6/2007 | Nakagawa et al. | 384/495 |
| 2007/0297706 A1* | 12/2007 | Mori | 384/558 |
| 2010/0215307 A1 | 8/2010 | Loeschner et al. | |
| 2010/0296934 A1 | 11/2010 | Warren | |
| 2012/0003096 A1 | 1/2012 | Nakashima et al. | |
| 2013/0129269 A1 | 5/2013 | Grehn | |

FOREIGN PATENT DOCUMENTS

| | | | | |
|---|---|---|---|---|
| JP | 2005147330 A * | 6/2005 | | F16C 33/36 |
| JP | 2005147408 A | 6/2005 | | |
| JP | 2006177445 A * | 7/2006 | | |
| WO | 2007095953 A1 | 8/2007 | | |

* cited by examiner

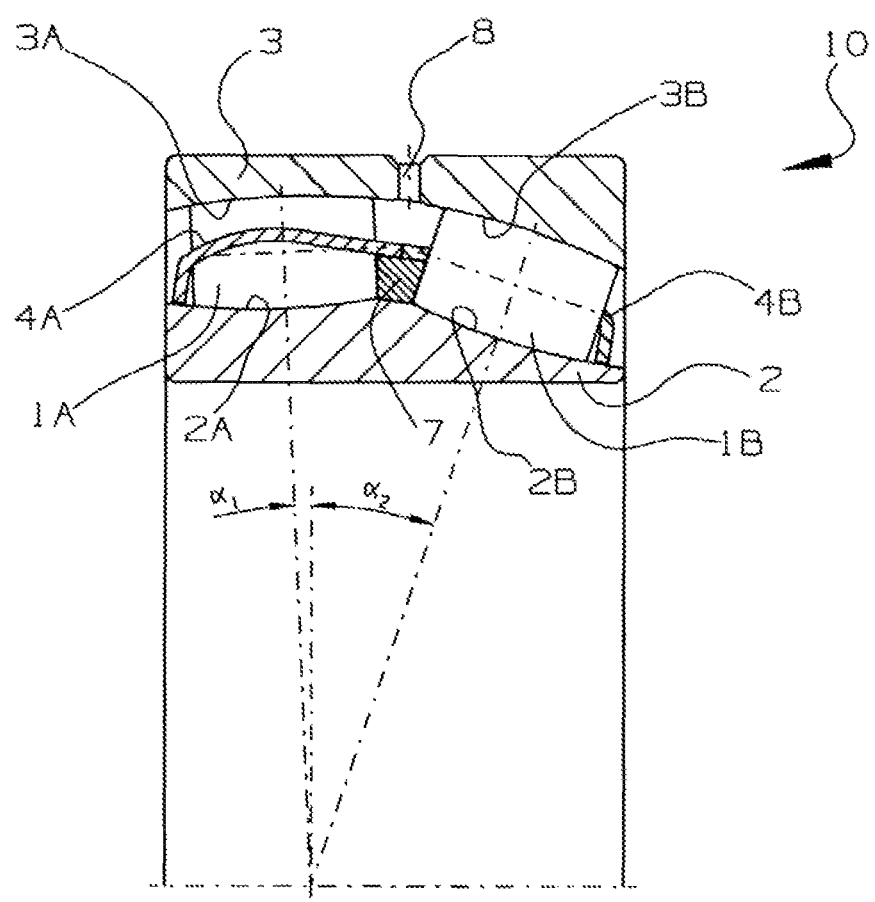

ROLLER BEARING FOR WIND TURBINES

TECHNICAL FIELD

Example aspects described herein relate to bearing assemblies, particularly of self-aligning bearings for wind turbine applications.

BACKGROUND

Bearing assemblies are typically circular in shape, and generally comprise rolling elements disposed between raceways in bearing rings. Rolling elements take many forms, including spherical balls, rollers or various other configurations, such as cone-shaped tapered rollers or barrel-shaped spherical rollers.

Bearings are widely used in wind power generation, particularly in the nacelle of the turbine, to support components in the gearbox and the main shaft of the wind turbine, which, typically the blade rotor assembly is mounted on. In large size wind turbines, the nacelle can be dozens of feet above the ground, thus maintaining the bearings supporting the main shaft of the blade rotor assembly can involve substantial labor, costs and often the use of specialized equipment, such as large cranes.

Both radial and thrust loads are generated during power generation cycles in a wind turbine as a result of the action of the wind on the blade rotors and, in turn, the main shaft. The main shaft bearing must, therefore, be able to support both radial and axial (or thrust) loads.

Various bearing assemblies are disclosed for rotatably supporting the main shaft of the wind turbine, for example, U.S. Pat. No. 7,918,649 discloses a double row spherical roller assembly with one row having rollers of different lengths from every roller of the other row.

SUMMARY OF THE INVENTION

A new design for a bearing assembly for a wind turbine is disclosed. In one example embodiment of the invention, the bearing comprises two rows of equal length rolling elements disposed between an inner ring and an axially split outer ring, the rolling elements retained by a cage.

BRIEF DESCRIPTION OF DRAWINGS

The above mentioned and other features and advantages of the embodiments described herein, and the manner of attaining them, will become apparent and be better understood by reference to the following description of at least one example embodiment in conjunction with the accompanying drawings. A brief description of those drawings now follows.

FIG. 1 is a cross sectional view of a bearing assembly according to one example embodiment herein described.

DETAILED DESCRIPTION OF THE INVENTION

Identically labeled elements appearing in different ones of the figures refer to the same elements but may not be referenced in the description for all figures. The exemplification set out herein illustrates at least one embodiment, in at least one form, and such exemplification is not to be construed as limiting the scope of the claims in any manner. Radially inward directions are from an outer radial surface of the cage, toward the central axis or radial center of the cage. Conversely, a radial outward direction indicates the direction from the central axis or radial center of the cage toward the outer surface. Axially refers to directions along a diametric central axis.

FIG. 1 is a cross sectional view of bearing assembly 10 according to one example embodiment of the invention. Bearing assembly 10 comprises inner ring 2 having inner races 2A and 2B on a radially inner circumferential surface, outer ring 3 having outer races 3A and 3B on a radially outer circumferential surface, first row rolling elements 1A disposed in cage 4A, second row rolling elements 1B disposed in cage 4B, each row, 1A and 1B, separated by floating spacer 7. Floating spacer 7 may be inner ring or outer ring guided, however, in the embodiment shown, spacer 7 is inner ring guided. Outer ring 3 is shown with lubrication hole 8, however, it is also contemplated in the present invention that no lubrication holes can be present in outer ring 3. Rolling elements 1A and 1B are shown as spherical rollers, however, the present invention contemplates the use of other rolling elements. In addition, rolling elements 1A and 1B are shown as of equal length.

In one example embodiment, first row rolling elements 1A operate at contact angle $\alpha 1$ and second row rolling elements 1B operate at contact angle $\alpha 2$, where $\alpha 1$ and $\alpha 2$ are different from each other. In the embodiment shown at FIG. 1, $\alpha 2$ is greater than $\alpha 1$, and therefore, second row rolling elements 1B are better accommodated to support increased thrust loads, for example, from a wind turbine rotor. In this configuration, first row rolling elements 1A would be mounted toward the rotor blades (not shown) of the wind turbine and second row rolling elements would be mounted toward the gearbox side (not shown) of the wind turbine.

In the foregoing description, example embodiments are described. The specification and drawings are accordingly to be regarded in an illustrative rather than in a restrictive sense. It will, however, be evident that various modifications and changes may be made thereto, without departing from the broader spirit and scope of the present invention.

In addition, it should be understood that the figures illustrated in the attachments, which highlight the functionality and advantages of the example embodiments, are presented for example purposes only. The architecture or construction of example embodiments described herein is sufficiently flexible and configurable, such that it may be utilized (and navigated) in ways other than that shown in the accompanying figures.

Although example embodiments have been described herein, many additional modifications and variations would be apparent to those skilled in the art. It is therefore to be understood that this invention may be practiced otherwise than as specifically described. Thus, the present example embodiments should be considered in all respects as illustrative and not restrictive.

LIST OF REFERENCE SYMBOLS

1A First Row Rolling Elements
1B Second Row Rolling Elements
2 Inner Ring
2A First Row Inner Race
2B Second Row Inner Race
3 Outer Ring
3A First Row Outer Race
3B Second Row Outer Race
4A First Row Cage
4B Second Row Cage
7 Spacer
8 Lubrication Hole 10 Bearing Assembly
α1 First Row Contact Angle
α2 Second Row Contact Angle

What we claim is:

1. A bearing assembly for supporting a main shaft of a wind turbine, the wind turbine comprising at least a blade rotor, a main shaft and a gearbox, the assembly comprising:
   an outer ring;
   at least two bearing raceways formed on a radially inner circumferential surface of the outer ring;
   an inner ring;
   at least two bearing raceways formed on a radially outer circumferential surface of the inner ring;
   a first row of rolling elements retained by a first cage;
   a second row of rolling elements retained by a second cage;
   all of the first row of rolling elements having the same length as all of the second row of rolling elements; and
   the second row of rolling elements has a greater contact angle than the first row of rolling elements.

2. The bearing assembly of claim 1, wherein the first row of rolling elements and the second row of rolling elements are separated by a floating spacer.

\* \* \* \* \*